United States Patent [19]

Chang et al.

[11] Patent Number: 4,963,698
[45] Date of Patent: Oct. 16, 1990

[54] CABLE SEALING

[75] Inventors: Rong J. Chang, Fremont; John A. Midgley, San Carlos; Lester T. Toy, Fremont, all of Calif.

[73] Assignee: Raychem Corporation, Menlo Park, Calif.

[21] Appl. No.: 408,479

[22] Filed: Sep. 15, 1989

Related U.S. Application Data

[63] Continuation of Ser. No. 188,124, Apr. 25, 1988, abandoned, which is a continuation of Ser. No. 65,649, Jun. 22, 1987, abandoned, which is a continuation of Ser. No. 859,160, May 2, 1986, abandoned, which is a continuation-in-part of Ser. No. 730,409, May 2, 1985, abandoned.

[51] Int. Cl.$^5$ .................... H02G 15/08; H02G 1/14
[52] U.S. Cl. .................... 174/77 R; 29/868; 156/49; 174/74 A; 174/76
[58] Field of Search .................... 174/74 A, 77 R, 76; 156/49; 29/868

[56] References Cited

U.S. PATENT DOCUMENTS

| | | | |
|---|---|---|---|
| 2,524,977 | 10/1950 | Holbrook et al. | 524/254 |
| 3,084,115 | 4/1963 | Smith et al. | 522/120 |
| 3,848,074 | 11/1974 | Channell | 174/77 R X |
| 3,879,575 | 4/1975 | Dobbin et al. | 174/92 |
| 3,950,604 | 4/1976 | Penneck | 174/DIG. 8 X |
| 3,992,569 | 11/1976 | Hankins et al. | 174/92 |
| 4,025,717 | 5/1977 | Whittingham | 174/76 X |
| 4,039,742 | 8/1977 | Smith | 174/87 |
| 4,103,911 | 8/1978 | Giebel et al. | 277/210 |
| 4,117,259 | 9/1978 | Giebel et al. | 174/92 |
| 4,170,575 | 10/1979 | Rothenberg | 174/102.50 |
| 4,187,360 | 2/1980 | Peters | 525/339 |
| 4,231,986 | 11/1980 | Brauer et al. | 264/272 |
| 4,288,471 | 9/1981 | Lanier | 174/77 R |
| 4,332,975 | 6/1982 | Dienes | 174/76 |
| 4,343,844 | 8/1982 | Thayer et al. | 428/36 |
| 4,369,284 | 1/1983 | Chen | 524/476 |
| 4,414,142 | 11/1983 | Vogel et al. | 252/506 |
| 4,438,294 | 3/1984 | Metisch et al. | 174/88 R |
| 4,485,218 | 11/1984 | Bell et al. | 428/383 X |
| 4,504,699 | 3/1985 | Dones et al. | 174/76 |
| 4,509,821 | 4/1985 | Stenger | 174/23 C X |
| 4,581,265 | 4/1986 | Follette | 428/36.1 |
| 4,647,717 | 3/1987 | Uken | 174/74 A X |
| 4,721,832 | 1/1988 | Toy | 174/74 A X |
| 4,741,940 | 3/1988 | Reed | 174/76 X |

FOREIGN PATENT DOCUMENTS

| | | |
|---|---|---|
| 0108518 | 5/1984 | European Pat. Off. . |
| 120437 | 10/1984 | European Pat. Off. .......... 174/77 R |
| 0174165 | 3/1986 | European Pat. Off. . |
| 3127567 | 1/1983 | Fed. Rep. of Germany .... 174/77 R |
| 2057202 | 8/1983 | United Kingdom . |

OTHER PUBLICATIONS

"Cable Breakouts for Multiconductor Cables and Conduit Ends", Raychem Corporation (no date).

Primary Examiner—Morris H. Nimmo
Attorney, Agent, or Firm—Edith A. Rice; Herbert G. Burkard

[57] ABSTRACT

The invention relates to a sealed cable article and method for sealing the area between two or more cables and between the cables and an enclosure with a shaped article at a location where the cables exit from the enclosure, the method comprising (a) providing a shaped article of a polymeric gel said gel having (i) a cone penetration value of about 30 to about 450 ($10^{-1}$ mm), and (ii) an elongation of from about 25% to about 750%; (b) positioning the shaped article around the cables; and (c) positioning the enclosure such that it surrounds the shaped article. An article aspect of the invention comprises two or more cables, an enclosure surrounding the cables, and a polymeric gel having the properties as described above sealing the area between the cables and the enclosure. This invention also relates to a sealed cable end article and a method of sealing the end of a cable, the method comprising positioning a shaped article of a polymeric gel having the properties as described above to cover the end of a cable and positioning an enclosure around said shaped article and adjacent region of the cable. The article comprises one or more cable ends with a portion of the cable end exposed, a shaped article of a polymeric gel having the properties as described above positioned at the cable end, and an enclosure which surrounds the shaped article and the adjacent region of the cable.

93 Claims, 3 Drawing Sheets

FIG_1

FIG_2

FIG_3

FIG_4

FIG_5

FIG_6

FIG_7

FIG_8

FIG_9

CABLE SEALING

This application is a continuation of application Ser. No. 07/188,124 filed Apr. 25, 1988 which is a continuation of application Ser. No. 065,649 filed June 22, 1987, now abandoned, which in turn is a continuation of application Ser. No. 859,160 filed May 2, 1986, now abandoned, which in turn is a continuation-in-part of application Ser. No. 730,409 filed May 2, 1985, now abandoned.

BACKGROUND OF THE INVENTION (a) The Invention

The invention relates to a sealed cable article and method for sealing the area between two or more cables and between the cables and an enclosure at a location where the cables exit from the enclosure. The invention also relates to a sealed cable end article and method for sealing the exposed end of a cable.

(b) Background Information

At various places in an electrical distribution system, an electrical cable is divided into two or more components, for example, where a branch-off cable is connected to a main cable or where a cable containing three or more cores, is separated into the individual cores. Where one or more cables or cores are divided from the main cable, the cable insulation generally has been removed to permit the jointing of a branch-off cable or breakout of the cable cores. The area where the insulation has been removed must then be reinsulated. In the case of shielded or armored power cables, the shielding and armoring is also removed and must be re-established. This is generally accomplished by installing an enclosure around that region of the cables. The term "breakout" is used in this application to refer to either two or more cables or two or more cores where they separate from a main cable or cables.

Enclosures suitable for this use can be, for example, resin filled joint cases, polymeric sleeves or the like. The location where the individual cables exit from an enclosure, the area between the cables and between the cables or cores and enclosure must be sealed to prevent ingress of moisture. A number of methods have been used to seal breakouts with varying success. A heat shrinkable polymeric boot may be positioned on the breakout using mastic or adhesive to hold the boot in place. Heat shrinkable boots however are costly to manufacture because of their shape and usually require access to the cable conductor ends to slip the boot into the proper position over the breakout area. Adhesives and mastics have been put in the area between the breakout cable core and the main cable (crotch area) to seal but these are difficult to pack into the crotch area without leaving voids resulting in a poor seal and may require heat to cause them to flow and fill the crotch area. The application of heat can damage the conductor covering or the conductor. Tapes of dimensionally stable polymeric material with an adhesive or mastic have been used to wrap the cable breakout area but tend to leak if not properly overlapped.

Shaped articles have been used as sealing elements in a variety of methods. In U.S. Pat. No. 4,438,294 a sealing element of a thermoplastic or plastic material for a cable entrance socket is disclosed. The sealing element seals the area between the sheaths of cables using straight sided or concave articles which surround only a portion of the cable and conductors in the crotch area. No gels are disclosed and the thermoplastic or plastic materials described are substantially non-tacky and rigid.

In Great Britain Patent No. 2,057,202, a polymeric article is described comprising a cylindrical member with a plurality of channels for enclosing a plurality of cables. The articles may seal by being made heat recoverable or may be sealed with an adhesive or mastic. They are described as non-tacky useful to seal, protect and insulate cables. In U.S. Pat. No. 4,298,415 a branch off seal is disclosed comprising a heat recoverable sleeve and one or more clips attached to the sleeve opening to form the sleeve into a desired number of cable conduits.

SUMMARY OF THE INVENTION

In one method aspect, the invention relates to a method of sealing an area between two or more cables and between the cables and an enclosure at a location where the cables exit from the enclosure, which method comprises (a) providing a shaped article of polymeric gel said polymeric gel having
  (i) a cone penetration value of about 30 to about 400 ($10^{-1}$ mm),
  (ii) an elongation of from about 25% to about 850%;
(b) positioning the shaped article such that it surrounds each of the cables; and
(c) positioning the enclosure such that it surrounds the shaped article.

In a preferred embodiment the polymeric gel has a number of holes extending therethrough corresponding to the number of cables to be positioned through the holes.

In another method aspect the invention relates to a method of sealing the end of one or more cables comprising (a) providing one or more shaped articles of polymeric gel corresponding to the number of cable ends to be sealed, said polymeric gel having
  (i) a cone penetration value of about 30 to about 400 ($10^{-1}$ mm),
  (ii) an elongation of from about 25% to about 850%;
(b) positioning the shaped article at the end of the cable such that the exposed areas of the cable end are sealed;
(c) positioning an enclosure such that it surrounds the shaped article and adjacent region of the cable. Optionally, the shaped article may have a hole a portion of the way therethrough for positioning the cable end.

In another aspect the invention relates to a cable sealing kit which comprises (a) one or more shaped articles of a polymeric gel having one or more holes at least a portion of the way therethrough, the polymeric gel having
  (i) a cone penetration value of about 30 to about 400 ($10^{-1}$ mm),
  (ii) an elongation of from about 25% to about 850%; and
(b) an enclosure for surrounding the shaped article.

The shaped article may have the hole a portion of the way therethrough for sealing ends of cables or all the way therethrough for positioning a cable therein.

In its article aspect the invention relates to an article comprising (a) two or more cables;
(b) a shaped article of a polymeric gel, the polymeric gel having
  (i) a cone penetration value of about 30 to about 400 ($10^{-1}$ mm),
  (ii) an elongation of from about 25% to about 850%, and
(c) a enclosure surrounding the shaped article,
(d) the shaped article positioned such that it encloses the cables and seals the area between the cables and between the cables and the enclosure.

Another article of the invention relates to an article
(a) one or more cable ends with a portion of the cable end exposed;
(b) one or more shaped articles of a polymeric gel corresponding to the number of cable ends to be sealed, the polymeric gel having
  (i) a cone penetration value of about 30 to about 400 ($10^{-1}$ mm)
  (ii) an elongation of from about 25% to about 850%;
(c) the shaped article positioned at the cable end;
(d) an enclosure that surrounds the shaped article and the adjacent region of the cable.

Optionally the shaped article may have a hole a portion of the way therethrough for positioning the cable end.

DETAILED DESCRIPTION OF THE INVENTION

Gels are widely known in the art, for example silicone-based gels, polyurethane-based gels or polystyrenebutadienestyrene, polystyrene-isoprene-styrene, and polystyrene-ethylene butylene-styrene block copolymer based gels. Preferred gels for use in this invention are gelloid compositions comprising a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
(a) if derived from a solid, relatively high molecular weight polymer, having a gel fraction of at least about 50%, or
(b) if derived from a liquid, relatively low molecular weight polymer, having at least about 0.1 (preferably 0.1 to about 3) crosslinks per weight average molecule;

said composition having a storage modulus of $(1+2.5v+14.1v^2) \times$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C., and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking. These compositions are described more fully in application Ser. No. 859,162, filed concurrently herewith which is a continuation-in-part of copending application Ser. No. 772,073, filed Sept. 3, 1985, which in turn is a continuation-in-part of application Ser. No. 646,555, filed Aug. 31, 1984, all now abandoned the disclosures of which are incorporated herein by reference.

The shaped article preferably has a number of holes, corresponding to the number of cables or cores of the breakout. When forming the gel into such a shaped article the holes are formed preferably slightly smaller than the size of the cable that is to be inserted therein. The gels used in the invention will stretch to accommodate the increased size cable and the tension created provides a better seal. The number of holes should correspond to the number of cables to pass therethrough. The holes may be stretched by placing tubes, mandrels or other articles in the holes to keep them in an expanded condition prior to placing the shaped article around the cables. The tubes may then be removed when the shaped article is in place. There is preferably a slit extending from the edge of each hole to the outer edge of the article so that the shaped article may be placed around the cables without access to the free end of the cable. A hole may also be larger or the same side as the cable.

When the shaped article is to be used to seal a cable end, if a hole is used, the hole should not pass all the way through the shaped article. The shaped article need not have any hole. Rather, it must be at least slightly larger than the cable end and substantially conform thereto. (see FIG. 8). The shaped article will provide the environmental seal necessary and be held in place by an enclosure used.

The polymeric gel is selected such that it has a cone penetration value as measured by ASTM D-937-77, of from about 30 to about 400 ($10^{-1}$ mm) and preferably from about 50 to about 350 ($10^{-1}$ mm). Further, said gel is selected such that it has an elongation, as measured by ASTM D-412, of from about 25% to about 850% and more preferably from about 100% to 750%. The gels may further be selected for their insulative, stress grading, or conductive as well as their sealing properties. Generally, it is preferable that the gel should have a dielectric constant (permittivity) of less than 6 at 50 Hz for insulating gels and greater than 6 for stress grading gels (as measured by ASTM D-150). Where the gel is used as insulation as well as sealing, the gels preferably have a volume resistivity of at least $10^{10}$ ohm-cm (as measured by ASTM D-257). For stress grading applications, the gels preferably have a specific impedance of $10^7 - 10^{10}$ ohm-cm at 50 Hz (ASTM D-150), and for conductive applications, the gels preferably have a volume resistivity of less than $10^7$ ohm-cm. The gels possess sufficient tack to seal and adhere to the breakout or cable end. Further the properties of the gel allow cable movement without breaking the seal formed, due to the gels ability to deform and return substantially to its original shape while maintaining the tack necessary to seal.

As mentioned above, the preferred gels for use in this invention are gelloid compositions comprising a crosslinked, non-silicone polymer having dispersed therein from about 20% to about 95% by weight of a liquid and having certain specified properties.

These compositions are preferably prepared by subjecting a non-silicone liquid polymer containing from about 20% to about 95% by weight of a liquid to a crosslinking means such as a chemical means or irradiation means. The polymer starting material is a crosslinkable liquid polymeric material, preferably a non-silicone liquid rubber, with low or no unsaturation prior to crosslinking. The liquid polymeric material preferably has a molecular weight of less than about 90,000, preferably less than about 50,000, and a Mooney viscosity of ML 1+4 at 100° C. of less than 10. Mooney viscosity is measured by ASTM D-1646. Said polymers are primarily liquids at these molecular weights and viscosities. The liquid polymer preferably has a molecular weight less than about 7.5 times the polymer's critical molecular weight (see e.g. Mechanical prop of Polymers, Nielsen 1962 for a discussion of critical molecular weight). The polymers can be a hydrocarbon backbone polymer or a polymer containing carbon as well as other atoms, e.g. oxygen, nitrogen, etc. in the backbone with the exception of silicone. The polymers are limited to those which have low or no unsaturation prior to crosslinking. In general, the amount of unsaturation will be less than about 10% mole, preferably less than about 7 mole percent and preferably less than 4 mole percent. If the unsaturation is too high the resulting product tends to be thermally unstable.

Preferred liquid polymeric materials include liquid butyl rubber, epichlorohydrin rubber, ethylene-propylenediene monomer rubber (EPDM), hydrogenated polyisoprene, hydrogenated polybutadiene, hydrogenated styrene-butadiene rubber (SBR), hydrogenated polychloroprene, functionalized polyisobutylene (i.e. polyisobutylene with reactive groups added that are capable of crosslinking such as hydroxy, amine or carboxy groups), chlorinated polyethylene, liquid fluorinated polymers (e.g. Viton from DuPont), hydrogenated nitrile rubber and other hydrogenated liquid polymers. Further, one can combine the various polymers to form compositions of desired properties.

The liquid dispersed in the crosslinked polymer in accordance with this invention can be any liquid which is capable of being dispersed in the polymer in an amount from about 20% to about 95%, and which does not react during crosslinking of the polymer. The liquid may be a plasticizer, compatibilizer, tackifier, or the like. Suitable liquids include, for example, paraffinic oils, naphthenate oils, aromatic oils, liquid polybutenes, alkyl (or aryl) phthalates, vegetable oils, mineral oils, trimellitates, esters of polyethylene glycols, alkyl (or aryl) phosphates, methyl ester of hydrogenated wood rosin, liquid rosin oils, pine tar, polyterpenes, non-reacting liquid rubbers, the starting liquid polymer which remains uncrosslinked or at least crosslinked less than 0.1 crosslink per weight average molecule, and the like.

Crosslinking may be by any conventional crosslinking means, preferably UV means, irradiation means or by chemical means. Radiation crosslinking can be accomplished by electron beam, or the like treatment. Suitable crosslinking promoters can be incorporated to encourage radiation crosslinking such as triallylcyanuate and triallylisocyanuate. Suitable chemical crosslinking agents can be chosen based on the individual polymer or polymers used. For example, a phenolic resin or p-quinone dioxime can be used to cure butyl rubber, peroxide can be used to cure EPDM or diisocyanate dimer acid can be used to cure epichlorohydrin rubber.

Optionally, plasticizers may be added to help obtain a gelloid with the desired cone penetration values. Such plasticizers preferably would include all liquids which are capable of reducing the viscosity of the base rubber, have low or no unsaturation as described above and are compatible with the base rubber.

A filler may be added to the composition, if desired. Generally, the amount of filler added is from 0 to 0.3 volume fraction. Preferably, the filler is in an amount from 0.1 to 0.2 volume fraction. The term "filler" is used herein to include all solid additives including particulate matter or fibrous matter present in the composition. These fillers include pigments, fillers known for conductive, (both electrical and thermal) stress grading and insulative purposes e.g. carbon black, barium titnate, zinc oxide, iron oxide, silicone carbide, metals and the like, reinforcing agents, thermal stabilizers, fungicides, biocides, flame retardants, for example, aluminum trihydrate, and the halogenated flame retardants, leak indicators (i.e. chemicals which react upon exposure to certain chemicals), corrosion inhibitors, ultraviolet light stabilizers, processing aids, impact modifiers and the like.

The compositions are formed preferably by mixing a liquid non-silicone polymer with any desired fillers in an amount of from 0 to 0.3 volume fraction, any cross-linking agents or the like and the liquid and subjecting the mixture to a crosslinking means. The composition will generally take the shape of the container during crosslinking but can be reshaped e.g. by cutting as desired.

The term cable is used in this application to refer to one or more electrical conductors surrounded by electrical insulation. In the case of a breakout, two or more cores, i.e. conductor and insulation, are divided from a main cable which contains those cores surrounded by a common insulation layer, optionally with shielding and/or armoring. The sealing method of this invention, is applied to sealing between the individual cores and the individual cores and enclosure. The term cable in the general description and claims is to be understood to cover the individual cores of a breakout or the main cable or the like. In the case of a branch-off one or more cables are jointed to a main cable. The sealing method of this invention is applied to sealing between the two or more branch-off cables and the main cable mentioned above. The term breakout is used herein to apply to such branchoffs as well as breakouts.

The enclosure may be any material suitable for enclosing a cable breakout or cable end. One skilled in the art would be able to select an appropriate enclosure. For example, dimensionally stable, preferably polymeric, tapes, shells and the like can be applied. Polymeric materials include polyethylene, polypropylene, polyvinylchloride, polyvinylidene fluoride, polyamides, polyesters, fluorinated polymers, ethylene-propylene rubbers, EPDM and polystyrene-butadiene-styrene (SBS), polystyreneisoprenestyrene (SIS) and polystyrene-ethylenebutylene-styrene (SEBS) block copolymers. Dimensionally recoverable polymeric articles are especially preferred for enclosures.

The dimensionally recoverable polymeric article is preferably of the heat recoverable type, preferably a polyolefen such as polyethylene. Other polymers such as polyvinyl chloride and polymeric blends can also be used. Particularly preferred is cross-linked polyethylene.

The term "recoverable article" is used herein to mean an article the dimensional configuration of which may be made substantially to change when subjected to some treatment. Heat-recoverable articles, which recover when heated, are particularly preferred in the practice of this invention. Usually these articles recover, towards an original shape from which they have previously been deformed but the term "recoverable", as used herein, also includes an article which adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962, 3,086,242 and 3,597,372. As is made clear in, for example, U.S. Pat. No. 2,027,962, the original dimensionally heat-stable form may be a transient form in a continuous process in which, for example, an extruded tube is expanded, while hot, to a dimensionally heat-unstable form but, in other applications, a preformed dimensionally heat-stable article is deformed to a dimensionally heat-unstable form in a separate stage.

In the production of heat recoverable articles, the polymeric material may be cross-linked at any stage in the production of the article that will enhance the desired dimensional recoverability. One manner of producing a heat-recoverable article comprises shaping the polymeric material into the desired heat-stable form, subsequently cross-linking the polymeric material, heating the article to a temperature above the crystalline melting point or, for amorphous materials the softening point, as the case may be, of the polymer, deforming the article and cooling the article while in the deformed state so that the deformed state of the article is retained. In use, since the deformed state of the article is heat-unstable, application of heat will cause the article to assume its original heat-stable shape.

In other articles, as described, for example, in British Patent No. 1,440,524, an elastomeric member such as an inner tubular member is held in a stretched state by a second member, such as an outer tubular member, which, upon heating weakens and thus allows the elastomeric member to recover.

Articles which are dimensionally recoverable without the application of heat are described in U.S. Pat. Nos. 4,070,746, 4,179,320 and 4,338,970. Such articles comprise an elastomeric member held in a stretched state by a retaining member. The elastomeric member is retained in the stretched state until released from the retaining member by application of solvent or by mechanically breaking or removing the retaining member. Typically, such articles comprise an elastomeric tube held in a stretched state by an outer tubular member to which it is adhered. Polymeric sleeve which recover without application of heat can be used in the practice of this invention.

Optionally, the enclosure may have an inner layer of adhesive to aid in bonding the enclosure to the shaped article and any overlap of the enclosure onto the cable or cable insulation. The adhesive inner layer can be any sealant typically used to bond an enclosure to a cable. Such sealants typically comprise mastics or hot melt adhesives.

Particularly preferred for an adhesive inner layer are hot melt adhesives containing ethylene copolymers, for example copolymers of ethylene with vinyl acetate, malaic anbydric acrylic acid, methacrylic acid or an alkyl acrylate such as ethyl acrylate. Mastics can also be used, for example, low molecular weight polyisobutylene based mastic compositions.

The enclosure, the shaped article and/or the adhesive inner layer can contain various additives as desired. Additives include, for example, stabilizers, reinforcing or non-reinforcing fillers, pigments, carbon black, plasticizers, surfactents, processing aids, corrosion inhibitors conductive fillers, fungicides, biocides, leak indicators and the like where appropriate.

A seal for a cable breakout area or other group of two or more cables is formed by positioning the shaped article of the polymeric gel around the cables. This may be done by positioning the free ends of the cables through the holes in the shaped article. Another method involves providing a slit in the shaped article between the hole and an edge of the shaped article such that the article can be opened to position the cables inside the holes and then reclosed. The tack of the material is such that on reclosure a seal is formed. The shaped article may optionally be formed by joining two or more pieces together to form the desired shape. An adhesive can be used to join the pieces but the tack of the material and the compressive force of the enclosure may be sufficient to provide an adequate seal. Where one or more cable ends are to be sealed, a shaped article is placed on the cable end such that the shaped article is positioned on the surface of the cable end or each cable end is positioned in a hole in the shaped article, the hole being only a portion of the way through the shaped article. An enclosure is then placed such that it surrounds the shaped article and overlaps a portion of the cable. The gel is so positioned that when surrounded with the enclosure it forms a seal preventing the ingress of water and the like. Likewise the gel is chosen such that the gel itself forms a barrier against water and the like. As can be seen from the drawings, the enclosure surrounds only a portion of the shaped article, the shaped article being open to the environment. In another embodiment, a cover, e.g. a polymeric or metallic article is placed over the exposed portion of the shaped article to act as a cover to protect the shaped article against dirt, or the like. Where there is substantial pressure from inside the cable the cover can be used to prevent the shaped article from being forced out of the opening in the enclosure. It is contemplated that the enclosure can completely cover the shaped article and that the cover is therefore an integral part of the enclosure. In another embodiment there is a multiplicity of cable ends and a multiplicity of shaped articles corresponding to the number of cable ends wherein there is one enclosure surrounding all the shaped articles and adjacent portions of the cables. (See FIG. 9).

Figure 1:
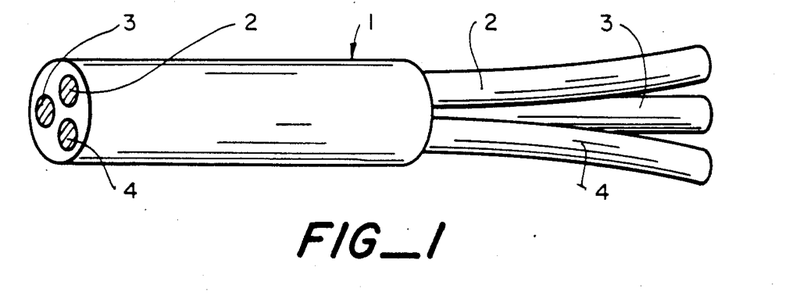
FIG. 1 illustrates a cable to be sealed in accordance with this invention.
Figure 2:
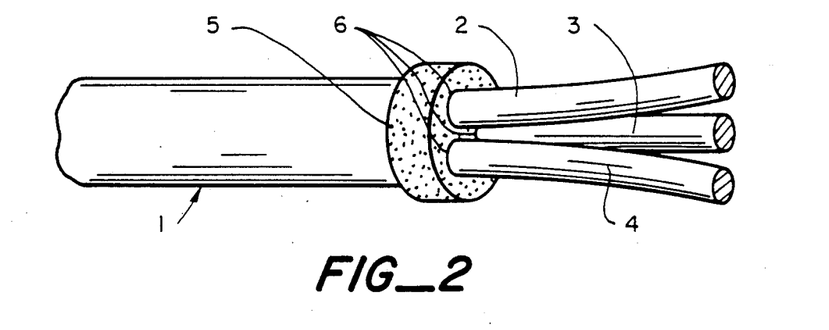
FIG. 2 illustrates the cable of FIG. 1 in which a shaped article of polymeric gel is positioned to seal the cable.
Figure 3:
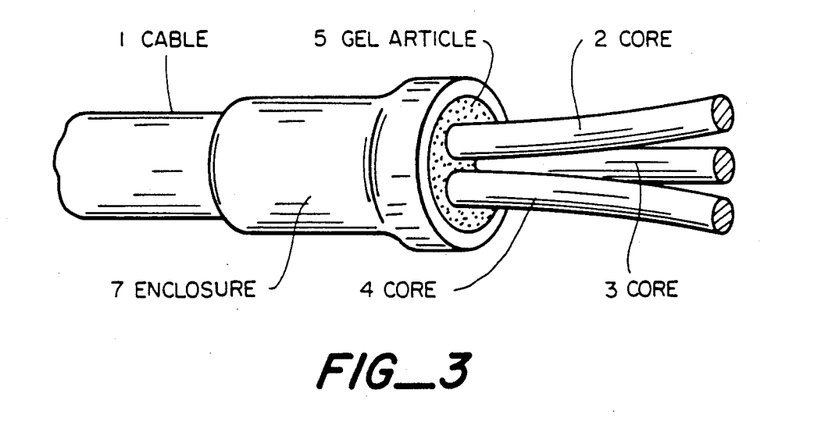
FIG. 3 illustrates the cable plus shaped article of FIG. 2 to which has been added an enclosure.
Figure 4:
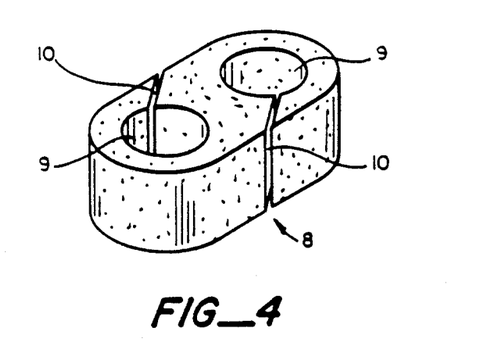
FIG. 4 illustrates a shaped article of polymeric gel suitable for use in this invention.
Figure 5:
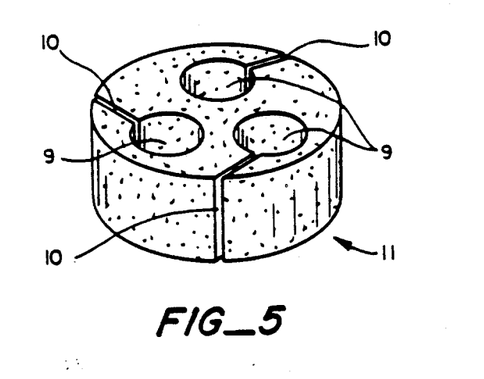
FIG. 5 illustrates an alternate embodiment of a shaped article of polymeric gel suitable for use in this invention.
Figure 6:
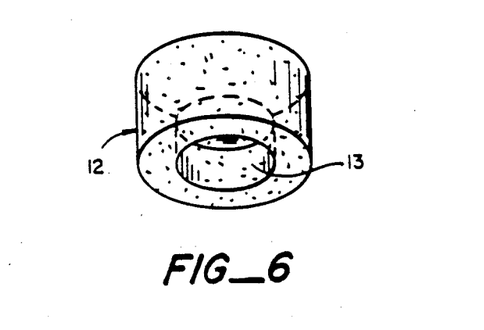
FIG. 6 illustrates a shaped article of polymeric gel suitable for sealing a cable end in accordance with this invention.
Figure 7:
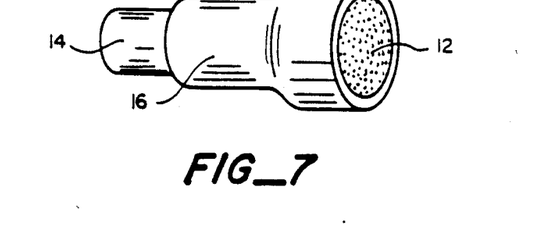
FIG. 7 illustrates a cable end sealed in accordance with this invention.
Figure 8:
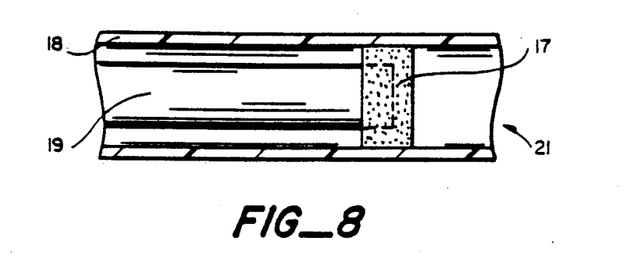
FIG. 8 illustrates a cable end sealed in accordance with this invention.
Figure 9:
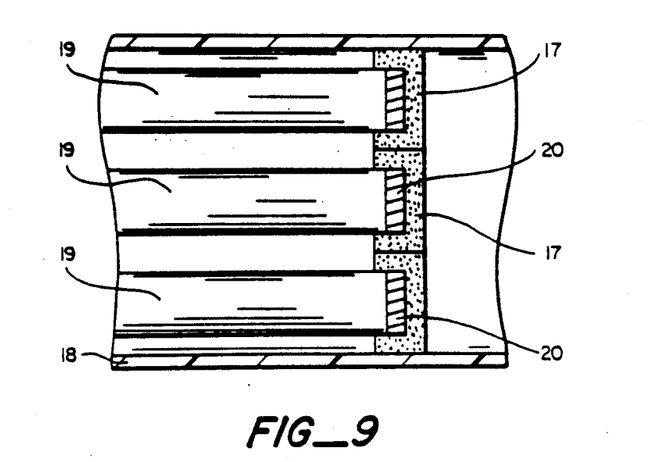
FIG. 9 illustrates sealing a multiplicity of cable ends in accordance with this invention.

In the drawings, FIG. 1 shows a cable 1 with 3 cores 2, 3 and 4 which have been separated from the cable by removal of the protective sheath. FIG. 2 shows the same cable 1 with a shaped article 5 of a polymeric gel wherein cores 2, 3 and 4 have been positioned through holes, 6, 6, and 6. FIG. 3 shows the cable of FIG. 2 wherein an enclosure 7 surrounds the shaped article of polymeric gel 5 and a portion of the cable 1. A portion of the polymeric gel is exposed to the environment. FIGS. 4 and 5 show shaped articles 8 and 11 of a polymeric gel. The articles each have holes 9 for positioning cables therethrough and slits 10 for positioning the shaped article around cables without access to their free end. FIG. 6 shows a shaped article 12 with a hole 13 for positioning a cable end therein. FIG. 7 shows a cable end 14 with a shaped article 12 sealing the end of the cable and enclosed by the enclosure 16 leaving a portion of the gel exposed to the environment. FIG. 8 shows a cross section of a sealed cable end 21 where there is a shaped article 17 with no hole positioned at the end of cable 19 and surrounded by enclosure 18. FIG. 9 shows another embodiment of the cable end sealing of the invention. A multiplicity of exposed cable ends 20 have shaped articles 17 positioned over their exposed ends and are enclosed within one enclosure 18.

The following examples are illustrative only and are not to be construed as limiting the invention. One skilled in the art would readily be able to select appropriate crosslinking agents, crosslink promotors, gels, radiation levels, cable breakouts, sets of cables, cable ends, enclosures, adhesives, mastics, etc. for a particular application without undue experimentation.

DESCRIPTION OF THE PREFERRED EMBODIMENTS

Example 1 - Chemically crosslinked butyl rubber (dielectric gel)

The following formulation was mixed then was cured for 30 minutes at 100° C. to form a gel.

| | |
|---|---|
| Liquid butyl rubber | 100 g |
| Zinc Stearate-filler | 5 g |
| Zirex (Zinc Resinate)-chemical crosslinking activator and filler | 10 g |
| Paraffinic oil—plasticizer | 90 g |
| p-Quinone Dioxime (62.5% in oil)-crosslinking agent | 3.2 g |
| Lead dioxide (50% in dibutylphthalate)-cure actuator | 15 g |
| Carbon black—colorant & U.V. light stabilizer | 2 g |

The resulting gel had a volume resistivity of $10^{14}$ ohm-cm (ASTM D-150), a permitivity @ 50 Hz of 3.0 (ASTM D-257) a cone penetration of 112 and elongation of 350%.

Example 2 - Chemically crosslinked epichlorohydrin (stress grading gel-oil resistant)

The following formulation was mixed and then cured for 60 minutes at 100° C. to form a gel.

| | |
|---|---|
| Hydrin 10X1 (liquid epichlorohydrin rubber) | 100 g |
| Dimer acid diisocyanate-crosslinking agent | 46 g |
| dioctyl phthalate-plasticizer | 100 g |
| T-12—tin catalyst | 10 g |
| Dabco 33LV (Tertiary amines-co-catalyst) | 2 g |
| Antioxidant 2246—substituted phenol type of antioxidant | 0.8 g |

The resulting gel had a specific impedance at 50 Hz of $1.8 \times 10^9$; a permitivity @ 50 Hz of 7.4, a cone penetration value of 51.

Example 3 - Stress Grading Butyl gel

| | |
|---|---|
| Kalene 200 (liquid butyl rubber) | 100 g |
| Kaydol oil (mineral oil) | 95 g |
| p-quinone dioxime prespersion (62.5%) | 4.8 g |
| Lead dioxide prespersion (50%) | 18 g |
| N990 Carbon Black (Thermax MT) | 69.4 g |
| S37 Carbon Black (Vulcan P) | 14.7 g |

Crosslinked at 100° C. for 30 minutes resulted in a gel with cone penetration value of 81, a specific impedance of $9.5 \times 10^8$, a permitivity of 32.6.

Example 4 - Conductive Butyl Gel

| | |
|---|---|
| Kalene 200 (liquid Butyl rubber) | 100 g |
| Kaydol oil (mineral oil) plasticizer | 95 g |
| p-quinone dioxime prespersion (62.5%) curing agent | 4.8 g |
| Lead dioxide prespersion (50%) curing activator | 18 g |
| Ketjen carbon black (conductive carbon black) | 20 g |

The above formulation was crosslinked at 100° C. for 30 minutes and resulted in a gel with cone penetration value of 42, volume resistivity $2.4 \times 10^5$ ohm-cm.

Example 5 - Gel Tape Formulation

| | |
|---|---|
| Kalene 800 (liquid butyl rubber) | 100 |
| Sunpar 2280 (plasticizer) (paraffinic oil) | 130 |
| Zinc Oxide Dispersion (80%) | 6.25 |
| Statex N660 (Carbon black) | 2 |
| Irgonox 1076 (Antioxidant) | 2 |
| SAG47 (silicone antifoaming agent) | 1 |
| HRJ2564 (Phenolic Resin) | 12 |
| | 253.25 |

Cured 50 minutes @ 150° C.
Gel content (based on liquid butyl rubber)=78%.
Storage modulus at 30° C.=$1.7 \times 10^4$ dynes/cm$^2$
Storage modulus at 90° C.=$7.3 \times 10^3$ dynes/cm$^2$
Dynamic viscosity at 30° C.=$4.2 \times 10^4$ poises
Dynamic viscosity at 90° C.=$2.0 \times 10^4$ poises
Exhibits first degree blocking.

Example 6

The polymeric gels in examples 1 through 5 are formed into a shaped article with 3 holes in a circular fashion (see FIG. 5) by casting the liquid rubber and remaining ingredients into a mold and crosslinking in said mold both with and without slits for application with and without access to the cable ends.

A three core conductor cable, each conductor being 4/0 gauge is stripped of its protective sheath to a distance of about 7 in. exposing each of the 3 cable core. The shaped article of polymeric gel is placed such that the cables pass through the holes and as close to the crotch as possible thereafter a polymeric tube of heat recoverable cross-linked polyethylene is shrunk down over the shaped article exposing the area where the cables exit the gel (see FIG. 3). The sealed cable is then tested for leaks by immersion in water and then measuring the change if any in resistance. After 200 hours immersion in water no leaks are observed.

Example 7

The gels examples 1 through 5 are formed into a shaped article by casting in a mold and crosslinking therein. Samples were made with and without a hole a portion of the way through the shaped article (see FIG. 6 and 8). A single conductor cable end is placed in the hole in the shaped article or where appropriate the shaped article placed at the end of the cable. A tube of heat recoverable crosslinked polyethylene is shrunk down on the shaped article having the end of the shaped article exposed (see FIG. 7). The cable end seal is tested for leaks by immersion in water and then measuring the change, if any, in resistance between a wire immersed in the water and the sealed cable. After 200 hours immersion in water no leaks are observed.

What is claimed is:

1. A method of sealing an area between two or more cables and between the cables and an enclosure at a location where the cables exit from the enclosure, which method comprises
    (a) providing a shaped article of polymeric gel, said polymeric gel having
        (i) a cone penetration value of about 30 to about 400 ($10^{-1}$ mm),
        (ii) an elongation of from about 25% to about 850%;
    (b) positioning the shaped article such that it surrounds each of two or more cables; and
    (c) positioning an enclosure such that it surrounds the shaped article whereby the area between said two or more cables and said enclosure is sealed at a location where the cables exit from the enclosure.

2. A method according to claim 1 comprising providing the shaped article with a number of holes extending therethrough corresponding to the number of cables and positioning the shaped article such that it surrounds each of the cables in a manner such that the cables are positioned through the holes of the shaped article.

3. A method according to claim 2 wherein the holes are formed slightly smaller than the size of the cable to be positioned therein.

4. A method according to claim 2 wherein there is a slit extending from the edge of a hole to the outer edge of the shaped article such that a cable may be positioned in the hole without access to a free end of the cable.

5. A method according to claim 1 wherein the gel provided has an elongation of from about 100% to 750%.

6. A method according to claim 1 wherein the gel provided has a cone penetration value is from about 50 to 350 ($10^{-1}$ mm).

7. A method according to claim 1 wherein the gel provided has a dielectric constant of less than 6 at 50 Hz and a volume resistivity of at least $10^{10}$ ohm-cm.

8. A method according to claim 1 wherein the gel provided has a dielectric constant of greater than 6 at 50 Hz and a specific impedance of $10^7$–$10^{10}$ ohm-cm at 50 Hz.

9. A method according to claim 1 wherein the gel provided has a volume resistivity of less than $10^7$ ohm-cm.

10. A method according to claim 1 wherein the gel provided is a silicone-based gel.

11. A method according to claim 1 wherein the gel provided is a polyurethane based gel.

12. A method according to claim 1 wherein the gel provided comprises a crosslinked non-silicon polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
    (a) if derived from a solid, relatively high molecular weight polymer, having a gel fraction of at least about 50%, or
    (b) if derived from a liquid, relatively low molecular weight polymer, having at least about 0.1 crosslinks per weight average molecule;

said composition having a storage modulus of $(1+2.5v+14.1v^2) \times$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C.; and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking.

13. A method according to claim 12, wherein said gel is derived from a liquid rubber.

14. A method according to claim 13 wherein the liquid rubber is liquid butyl rubber.

15. A method according to claim 1 wherein the enclosure is a dimensionally recoverable polymeric article.

16. A method according to claim 5 wherein the polymeric article is heat recoverable polyethylene.

17. A method according to claim 1 wherein the enclosure is a dimensionally stable polymeric article.

18. A method according to claim 17 wherein the enclosure is in the form of a tape.

19. A method according to claim 1 wherein the enclosure has an adhesive inner layer.

20. A method according to claim 1 wherein the shaped article is positioned by wrapping it around the cables.

21. A method of sealing an end of each of one or more cables comprising
    (a) providing one or more shaped article of polymeric gel corresponding to the number of cable ends to be sealed, said polymeric gel having:
        (i) a cone penetration value of about 30 to about 400 ($10^{-1}$ mm),
        (ii) an elongation of from about 25% to about 850%;
    (b) positioning a shaped article at the end of each of one or more cables such that the end of each cable is sealed; and
    (c) positioning an enclosure such that it surrounds the shaped articles.

22. A method according to claim 21 wherein each of the one or more shaped articles has a hole a portion of the way therethrough for positioning one of said cable ends therein.

23. A method according to claim 21 wherein the gel provided, has an elongation of from about 100% to 750%.

24. A method according to claim 21 wherein the gel provided has a cone penetration value is from about 50 to 350 ($10^{-1}$ mm).

25. A method according to claim 21 wherein the gel provided has a dielectric constant of less than 6 at 50 Hz and a volume resistivity of at least $10^{10}$ ohm-cm.

26. A method according to claim 21 the gel provided has a dielectric constant of greater than 6 at 50 Hz and a specific impedance of $10^7$–$10^{10}$ ohm-cm at 50 Hz.

27. A method according to claim 21 wherein the gel provided has a volume resistivity of less than $10^7$ ohm-cm.

28. A method according to claim 21 wherein the gel provided is a silicone-based gel.

29. A method according to claim 21 wherein the gel provided is a polyurethane-based gel.

30. A method according to claim 21 in the gel provided comprises a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
  (a) if derived from a solid, relatively high molecular weight polymer, having a gel fraction of at least about 50%, or
  (b) if derived from a liquid, relatively low molecular weight polymer, having at least about 0.1 crosslinks per weight average molecule;
said composition having a storage modulus of $(1+2.5v+14.1v^2) \times$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C.; and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking.

31. A method according to claim 21, wherein said gel is derived from a liquid rubber.

32. A method according to claim 31, wherein the liquid rubber is liquid butyl rubber.

33. A method according to claim 21 wherein the enclosure is a dimensionally recoverable polymeric article.

34. A method according to claim 33 the polymeric article is heat recoverable-polyethylene.

35. A method according to claim 21 wherein the enclosure is a dimensionally stable polymeric article.

36. A method according to claim 35 wherein the enclosure is in the form of a tape.

37. A method according to claim 21 wherein the enclosure has an adhesive inner layer.

38. A method according to claim 21 wherein a multiplicity of cable ends and a multiplicity of shaped articles corresponding to the number of cable ends have one enclosure which surrounds the multiplicity of shaped articles.

39. An article comprising
  (a) two or more cables;
  (b) a shaped article of a polymeric gel, the polymeric gel having
    (i) a cone penetration value of about 30 to about 400 ($10^{-1}$ mm),
    (ii) an elongation of from about 25% to about 850%; and
  (c) an enclosure surrounding the shaped article;
  (d) the shaped article positioned such that it encloses the cables and seals the area between the cables and between the cables and the enclosure.

40. An article according to claim 39 wherein the shaped article has a number of holes extending therethrough corresponding to the number of cables and the cables are positioned through the holes of the shaped article such that the shaped article surrounds each of the cables.

41. An article according to claim 40 wherein the holes are formed slightly smaller than the size of the cables that are positioned therein.

42. An article according to claim 39 wherein there is a slit extending from the edge of the holes to the outer edge of the shaped article such that a cable has been positioned in the hole without access to the free end of the cable.

43. An article according to claim 39 wherein the gel provided has an elongation of from about 100% to 750%.

44. An article according to claim 39 the gel provided has cone penetration value is from about 50 to 350 ($10^{-1}$ mm).

45. An article according to claim 39 wherein the gel provided has a dielectric constant of less than 6 at 50 Hz and a volume resistivity of at least $10^{10}$ ohm-cm.

46. An article according to claim 39 wherein the gel provided has a dielectric constant of greater than 6 at 50 Hz and a specific impedance of $10^7$–$10^{10}$ ohm-cm at 50 Hz.

47. An article according to claim 39 wherein the gel provided has a volume resistivity of less than $10^7$ ohm-cm.

48. An article according to claim 39 wherein the gel provided is a silicone-based gel.

49. An article according to claim 39 wherein the gel provided is a polyurethane-based gel.

50. An article according to claim 39 wherein the gel provided comprises a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
  (a) if derived from a solid, relatively high molecular weight polymer, having a gel fraction of at least about 50%, or
  (b) if derived from a liquid, relatively low molecular weight polymer, having at least about 0.1 crosslinks per weight average molecule;
said composition having a storage modulus of $(1+2.5v+14.1v^2) \times$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C.; and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking.

51. An article according to claim 50 wherein said gel is derived from a liquid rubber.

52. An article according to claim 51 wherein the liquid rubber is liquid butyl rubber.

53. An article according to claim 39 wherein the enclosure is a dimensionally recovered polymeric article.

54. An article according to claim 53 the polymeric article is heat recovered polyethylene.

55. An article according to claim 39 wherein the enclosure is a dimensionally stable polymeric article.

56. An article according to claim 39 wherein the enclosure is in the form of a tape.

57. An article according to claim 39 wherein the enclosure has an adhesive inner layer.

58. An article comprising
(a) one or more cable ends with a portion of the cable end exposed;
(b) one or more shaped articles of a polymeric gel corresponding to the number of cable ends to be sealed, the polymeric gel having
   (i) a cone penetration value of about 30 to about 400 ($10^{-1}$ mm)
   (ii) an elongation from about 25% to about 850%;
(c) a said shaped article positioned at each cable end to be sealed;
(d) an enclosure that surrounds the shaped article.

59. An article according to claim 58 wherein the one or more said shaped article has a hole a portion of the way therethrough for positioning therein a cable end to be sealed.

60. An article according to claim 58 wherein the gel provided has an elongation of from about 100% to 750%.

61. An article according to claim 58 wherein the gel provided has a cone penetration value is from about 50 to 350 ($10^{-1}$ mm).

62. An article according to claim 58 wherein the gel provided has a dielectric constant of less than 6 at 50 Hz and a volume resistivity of at least $10^{10}$ ohm-cm.

63. An article according to claim 58 wherein the gel provided has a dielectric constant of greater than 6 at 50 Hz and a specific impedance of $10^7$–$10^{10}$ ohm-cm at 50 Hz.

64. An article according to claim 58 wherein the gel provided has a volume resistivity of less than $10^7$ ohm-cm.

65. An article according to claim 58 the gel provided is a silicone-based gel.

66. An article according to claim 58 wherein the gel provided is a polyurethane-based gel.

67. An article according to claim 58 wherein the gel comprises a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
(a) if derived from a solid, relatively high molecular weight polymer, having a gel fraction of at least about 50%, or
(b) if derived from a liquid, relatively low molecular weight polymer, having at least about 0.1 cross-links per weight average molecule;
said composition having a storage modulus of $(1+2.5v+14.1v^2) \times$ dynes/cm$^2$ wherein x is less than $5 \times 10^5$ at 30° C and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C.; and a dynamic viscosity of $(1+2.5v+14.1v^2)y$ poises wherein y is less than $1 \times 10^5$ at 30° C. and greater than $5 \times 10^2$ at 90° C. and v is the volume fraction of the filler, said composition exhibiting first degree blocking.

68. An article according to claim 67, wherein said gel is derived from a liquid rubber.

69. An article according to claim 68 wherein the liquid rubber is liquid butyl rubber.

70. An article according to claim 58 wherein the enclosure is a dimensionally recovered polymeric article.

71. An article according to claim 70 wherein the dimensionally recovered polymeric article is heat recoverable polyethylene.

72. An article according to claim 71 wherein the enclosure is a dimensionally stable polymeric article.

73. An article according to claim 58 wherein the enclosure is in the form of a tape.

74. An article according to claim 58 wherein the enclosure has an adhesive inner liner.

75. A cable sealing kit which comprises:
(a) one or more shaped articles of a polymeric gel having one or more holes at least a portion of the way therethrough, the polymeric gel having
   (i) a cone penetration value of about 30 to about 400 ($10^{-1}$ mm),
   (ii) an elongation of from about 25% to about 850%; and
(b) an enclosure for surrounding one or more said shaped articles.

76. A cable sealing kit according to claim 75 wherein each shaped article has holes therethrough corresponding to the number of cables to be sealed.

77. A kit according to claim 75 wherein each shaped article has holes a portion of the way therethrough.

78. A kit according to claim 75 wherein there is a slit extending from the edge of a hole to the outer edge of the shaped article such that a cable may be positioned in the hole without access to the free end of the cable.

79. A kit according to claim 75 wherein the gel provided has an elongation of from about 100% to about 750%.

80. A kit according to claim 75 wherein the gel provided has a cone penetration value is from about 50 to 350 ($10^{-1}$ mm).

81. A kit according to claim 75 wherein the gel provided has a dielectric constant of less than 6 at 50 Hz and a volume resistivity of at least $10^{10}$ ohm-cm.

82. A kit according to claim 75 wherein the gel provided a dielectric constant of greater than 6 at 50 Hz and a specific impedance of $10^7$–$10^{10}$ ohm-cm at 50 Hz.

83. A kit according to claim 75 wherein the gel provided has a volume resistivity of less than $10^7$ ohm-cm.

84. A kit according to claim 75 wherein the gel provided a silicone-based gel.

85. A kit according to claim 75 wherein the gel provided is a polyurethane-based gel.

86. A kit according to claim 75 wherein the gel provided comprises a crosslinked non-silicone polymer having an olefinic unsaturated content of less than 10 mole percent and having dispersed therein a liquid in an amount of from about 20% to about 95% by weight based on the weight of the liquid and polymer and from 0 to 0.3 volume fraction of a filler, said cross-linked polymer
(a) if derived from a solid, relatively high molecular weight polymer, having a gel fraction of at least about 50%, or
(b) if derived from a liquid, relatively low molecular weight polymer, having at least about 0.1 cross-links per weight average molecule;
said composition having a storage modulus of $(1+2.5v+14.1v^2) \times$ dynes/cm$^2$ wherein x is less than $5 \times 10^5$ at 30° C. and greater than $5 \times 10^2$ at 90° C., and v is the volume fraction of the filler, with the proviso that, if the crosslinked polymer is prepared from a solid high molecular weight polymer, the storage modulus at 140° C. is at least about 70% of the storage modulus at 70° C.; and a dynamic viscosity of $(1+2.5v+14.1v^2)y$ poises wherein y is less than $1\times10^5$ at 30° C. and greater than $5\times10^2$ at 90° C. and v is the volume fraction of the filler, said composition exhibiting first degree blocking.

87. A kit according to claim 86, wherein said gel is derived from a liquid rubber.

88. A kit according to claim 87 wherein the liquid rubber is liquid butyl rubber.

89. A kit according to claim 75 wherein the enclosure is a dimensionally recoverable polymeric article.

90. A kit according to claim 89 wherein the dimensionally recoverable polymeric article is heat recoverable polyethylene.

91. A kit according to claim 75 wherein the enclosure is a dimensionally stable polymeric article.

92. A kit according to claim 75 wherein the enclosure in the form of a tape.

93. A kit according to claim 75 wherein the enclosure has an adhesive inner liner.

* * * * *

UNITED STATES PATENT AND TRADEMARK OFFICE
CERTIFICATE OF CORRECTION

PATENT NO. : 4,963,698
DATED : October 16, 1990
INVENTOR(S) : Chang, et al

It is certified that error appears in the above-indentified patent and that said Letters Patent is hereby corrected as shown below:

Column 3, line 12, after the second occurrence of "article" insert --comprising--.

Column 7, line 66, replace "sleeve" by --sleeves--.

Column 8, line 11, replace "malaic anbydric acrylic" by --maleic anhydride, acrylic--.

Column 8, lines 19 to 20, replace "inhibitors" by --inhibitors,--.

Column 10, Example 3 table, line 3, replace "prespersion" by --dispersion--.

Column 10, Example 3 table, line 4, replace "prespersion" by --dispersion--.

Column 10, Example 4 table, line 3, replace "p-quimone" by --p-quinone-- and replace "prespersion" by --dispersion--.

Column 10, Example 4 table, line 4, replace "prespersion" by --dispersion--.

UNITED STATES PATENT AND TRADEMARK OFFICE
CERTIFICATE OF CORRECTION

PATENT NO. : 4,963,698
DATED : October 16, 1990
INVENTOR(S) : Chang, et al

It is certified that error appears in the above-indentified patent and that said Letters Patent is hereby corrected as shown below:

Column 11, line 47
    Claim 6, line 2, delete "is".
Column 12, line 61
    Claim 24, line 2, delete "is".
Column 14, line 15
    Claim 44, line 2, delete "is".
Column 15, line 16
    Claim 59, line 2, replace "article" by --articles--.
Column 15, line 24
    Claim 61, line 2, delete "is".
Column 16, line 36
    Claim 80, line 2, delete "is".

Signed and Sealed this

Fifth Day of July, 1994

Attest:

BRUCE LEHMAN

*Attesting Officer*     *Commissioner of Patents and Trademarks*